(12) United States Patent
Kagle

(10) Patent No.: US 8,051,488 B2
(45) Date of Patent: Nov. 1, 2011

(54) TRIAL USAGE FOR ENCRYPTED SUBSCRIPTION-BASED DATA

(75) Inventor: Jonathan C. Kagle, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1231 days.

(21) Appl. No.: 11/544,487

(22) Filed: Oct. 5, 2006

(65) Prior Publication Data

US 2008/0086632 A1    Apr. 10, 2008

(51) Int. Cl.
   G06F 21/22    (2006.01)
   G06F 15/16    (2006.01)
   H04L 9/32     (2006.01)

(52) U.S. Cl. ............... 726/27; 713/165; 705/52; 705/59

(58) Field of Classification Search ................. None
See application file for complete search history.

(56) References Cited

U.S. PATENT DOCUMENTS

| | | | |
|---|---|---|---|
| 4,740,890 A | 4/1988 | William ........................ 726/31 |
| 5,689,560 A | 11/1997 | Cooper et al. ................. 705/52 |
| 5,708,709 A | 1/1998 | Rose ............................. 705/59 |
| 5,757,908 A | 5/1998 | Cooper et al. ................. 713/165 |
| 5,892,900 A * | 4/1999 | Ginter et al. ................... 726/26 |
| 5,910,987 A * | 6/1999 | Ginter et al. ................... 705/52 |
| 5,915,019 A * | 6/1999 | Ginter et al. ................... 705/54 |
| 5,917,912 A * | 6/1999 | Ginter et al. ................... 713/187 |
| 5,982,891 A * | 11/1999 | Ginter et al. ................... 705/54 |
| 6,134,659 A * | 10/2000 | Sprong et al. ................. 713/190 |
| 6,195,432 B1 | 2/2001 | Takahashi et al. ............ 380/277 |
| 6,499,035 B1 | 12/2002 | Sobeski ............................. 1/1 |
| 6,854,061 B2 | 2/2005 | Cooper et al. ................. 713/190 |
| 7,046,997 B2 | 5/2006 | Bahr ............................. 455/418 |
| 7,055,030 B2 * | 5/2006 | Negawa ........................ 713/163 |
| 7,065,506 B1 * | 6/2006 | Phillipo et al. .................. 705/58 |
| 7,239,705 B2 * | 7/2007 | Kelley et al. .................. 380/239 |
| 7,363,276 B2 * | 4/2008 | Akiyama ........................ 705/55 |
| 2002/0164025 A1 | 11/2002 | Raiz et al. .................... 380/231 |
| 2003/0023853 A1 * | 1/2003 | Wajs ............................. 713/178 |
| 2006/0123117 A1 | 6/2006 | Heutchy et al. ............... 709/227 |
| 2007/0067301 A1 * | 3/2007 | Malik ............................. 707/10 |
| 2007/0201695 A1 * | 8/2007 | Saarikivi ....................... 380/231 |
| 2007/0201701 A1 * | 8/2007 | Kudelski ....................... 380/277 |
| 2008/0069357 A1 * | 3/2008 | Kim et al. ..................... 380/228 |

OTHER PUBLICATIONS

Yau, J., et al.; "*A Digital Rights Management System for e-Content*"; HKU CSIS Tech Report TR-2004-03; accessed Jun. 26, 2006 at http://www.csis.hku.hk/research/techreps/document/TR-2004-03.pdf; 15 pgs.

Eskicioglu, A., et al.; "*An overview of multimedia content protection in consumer electronics devices*"; Signal Processing: *Image Communication* 16 (2001) 681-699; Mar. 15, 2000; 19 pgs.

(Continued)

*Primary Examiner* — Christopher Revak

(74) *Attorney, Agent, or Firm* — Merchant & Gould

(57) ABSTRACT

Subscription based content is decrypted for one or more trial periods without shortening the subscription period for the device. The subscription period for the content does not start until the expiration of the last trial period. The subscription logic included with the device monitors a packet value received in a broadcast to determine when the device is receiving a packet within a trial period. The packet value is time-based such that the subscription logic can determine when the device has exceeded the number of allowed trial periods as well as to determine when the subscription ends.

20 Claims, 5 Drawing Sheets

OTHER PUBLICATIONS

Moffaert, A., et al.; "*Digital Rights Management*"; Alcatel Telecommunications Review; 2*nd* Quarter 2003; 8 pgs.

Dusparic, I., et al.; "*Mobile Software Licensing*"; Alcatel; Jul. 3, 2003; 12 pgs.

* cited by examiner

TRIAL USAGE FOR ENCRYPTED SUBSCRIPTION-BASED DATA

BACKGROUND

Encryption is used in many different subscription-based systems to protect data from being accessed without authorization. Some subscriptions impose a time-limit on the ability of a device to decrypt data. When the time-limit expires on the device, the subscription ends and the device no longer decrypts the data. Another way to protect subscription data is to use a "smart card" that is incorporated within a device. The smart card contains its own decryption mechanism along with a set of rules that determine the duration of the subscription. When the subscription ends these smart cards can be manually recharged or replaced by the user, or some other authorized entity. Additionally, the smart card must either be replaced or recharged if a user returns a device after only using a portion of the subscription during a trial period such that a user who obtains the device after its return receives the full subscription.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A device includes subscription logic that allows it to receive subscription based content for one or more trial periods without shortening the subscription period for the device. The subscription period for the content does not start until the expiration of the last trial period. In this way, a device may be returned by one user within one of the trial periods and be reactivated by another user within the same or another trial period. The subscription logic included with the device monitors a packet value received in a broadcast to determine when the device is receiving a packet within a trial period. The packet value is time-based such that the subscription logic can determine when the device has exceeded the number of allowed trial periods as well as to determine when the subscription ends.

DETAILED DESCRIPTION

Figure 1:
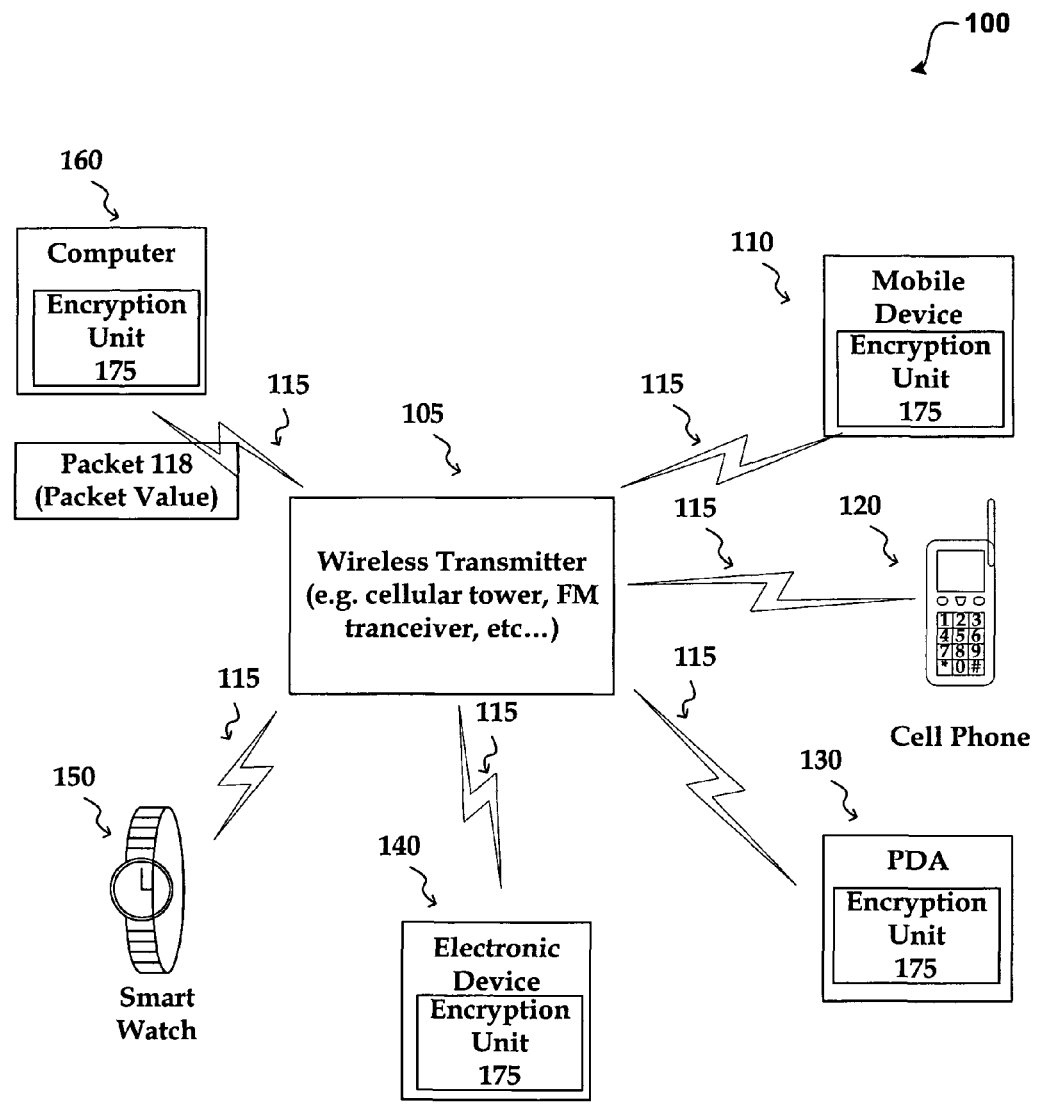
FIG. 1 illustrates an exemplary operating environment.

Referring now to the drawings, in which like numerals represent like elements, various embodiment will be described. In particular, FIG. 1 and the corresponding discussion are intended to provide a brief, general description of a suitable environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an example operating environment is described. As illustrated, operating environment 100 includes wireless transmitter 105 that is responsible for delivering broadcast content to wireless devices. Some of the broadcast content is subscription content that is delivered and decrypted by one or more of the electronic devices. Some example electronic devices that may include an electronic system that are configured to receive the broadcast content are illustrated in FIG. 1. Each of the electronic devices receives messages/information over the communication channel 115.

Generally described, the electronic devices illustrated in FIG. 1 are configured to receive subscription content broadcast within packets, such as packet 118, through communication channel 115. At least some of the packets that are delivered to the electronic devices include a time-based packet value. According to one embodiment, each packet 118 includes a packet value that increases with each packet that is broadcast from wireless transmitter 105 to the electronic devices. For example, the first packet that is broadcast may have a packet value of one and the one hundredth packet broadcast may have a packet value of 100. Any time-based packet numbering scheme, however, may be used to determine a time period for the number of packets that have been broadcast. For instance, the packet value could be a value indicating a time associated with the packet. Additionally, another numbering scheme could be used. For example, the packet value could decrease instead of increase. The packet value associated with packet 118 is used by an encryption unit 175 to determine whether or not to decrypt the subscription content. Generally, the encryption unit 175 uses the packet value to construct use/nonuse patterns for the device. This information is then used to enable or disable the decryption of the subscription data received through communication channel based on the rules established by the manufacturer, broadcast or some other authorized entity.

According to one embodiment, the encryption unit 175 is a smartcard. According to another embodiment, the encryption unit may be a secure processor included within the device. Electronic device 2 includes a secure, persistent storage that stores subscription and trial parameters which are used to determine how many trial periods are allowed, the duration of the "turned off" state that indicates that the trial period has been exceeded, the length of the subscription (measured in packets), and other items that are used by the encryption unit 175 in determining whether the device is within one of the allowed trial periods. The secure storage helps to ensure that the values are not easily tampered with which could result in a free subscription. Since there is no feedback mechanism, piracy would be undetectable if the secure storage areas could be hacked. As long as the packet value received in packet 118 indicates that the device is still within a trial period, the subscription period remains unaffected.

The broadcast data that is broadcast through communication channel 115 contains an encrypted area containing the subscription content being protected, and an unencrypted area. According to one embodiment, the packet value is included within the unencrypted area such that any device may access it.

According to one embodiment, the electronic device may include a button, or some other physical device (not shown), that allows a retailer to increase the number of trial periods and help to ensure that a returned unit would have its trial period reset. In this way, future use would not be seen as an extension of the original user's trial. According to one embodiment, the number of trial periods may not exceed a predetermined number. In this way, the number of trial periods would not last forever if the button were continually repressed to reset the trial period. Additionally, smart cards that are used for demonstration purposes may be programmed with a specific expiration packet number that corresponds to a finite expiration date (e.g. one year from the current date), at which point the card would be replaced. According to one embodiment, while the trial periods are based on a finite expiration date, the subscription for the content is based on a duration and not an absolute stop time.

According to another embodiment, the encryption unit 175 included on the devices are configured to ensure that the packet values received through communication channel 115 are always increasing. If the packet numbers are not increasing then this could be a sign of a hack attempt and the device may disable the card or lock secure processor.

According to one embodiment, the wireless transmitter 105 includes a cellular tower that may be used to communicate with a variety of electronic devices, including but not limited to: mobile devices 110; cell phones 120; personal digital assistants (PDAs) 130, electronic device 140; smart watches 150; as well as other computing devices. Some of the electronic devices could include devices such as notebooks, pocket PCs, tablet PCs, and the like.

According to another embodiment, the wireless transmitter 105 includes an FM transceiver that broadcasts signals over communication channel 115 to the various electronic devices. The FM broadcast may be any number of types including but not limited to: a standard FM transmission, a sub-carrier FM transmission, or any other type of FM transmission as may be desired. Example electronic devices that have an FM receiver or transceiver may include a computer 160, a watch 150, an electronic device 140, a PDA 130, a cell phone 120, and mobile device 110. The electronic devices are arranged to receive information from the wireless broadcast.

According to one embodiment, each broadcast transmission corresponds to the transmission of one or more frames. Each frame may include multiple messages, where some messages are public broadcast (aka "global" or "shared" messages), while other messages are client specific messages (aka "personal" or "private" messages). Every client that is located within the designated service region may receive shared messages, while a single client may decode a private message.

Electronic devices (e.g., electronic device 140) receive message packets according to shared and private messages that are directed to the client device. According to one embodiment, message packets are organized in groups according to logical slot (or channel) entry numbers. For example, a particular electronic device is configured to receive a selected group of channels from the available channels. Generally, the channels relate to subscription content. The message packets associated with each of those channels is received, processed, and at least some of the data is stored in the client device. Some electronic devices allow the stored message packets to be reviewed using a user interface. Example channels that may be broadcast over communication channel 115 include: a traffic channel, a stocks channel, a news channel, a sports channel, a time channel, a messages channel, a calendar channel, a weather channel, a horoscope channel, and a movies channel. For example, the weather channel includes weather information for one or more cities and the news channel includes news stories from particular sources. Many other channels may be implemented. Messages associated with each channel are delivered to the electronic devices and include message content that is based on the particulars of the channel. Any number of these channels may be monitored by a device.

Figure 2:
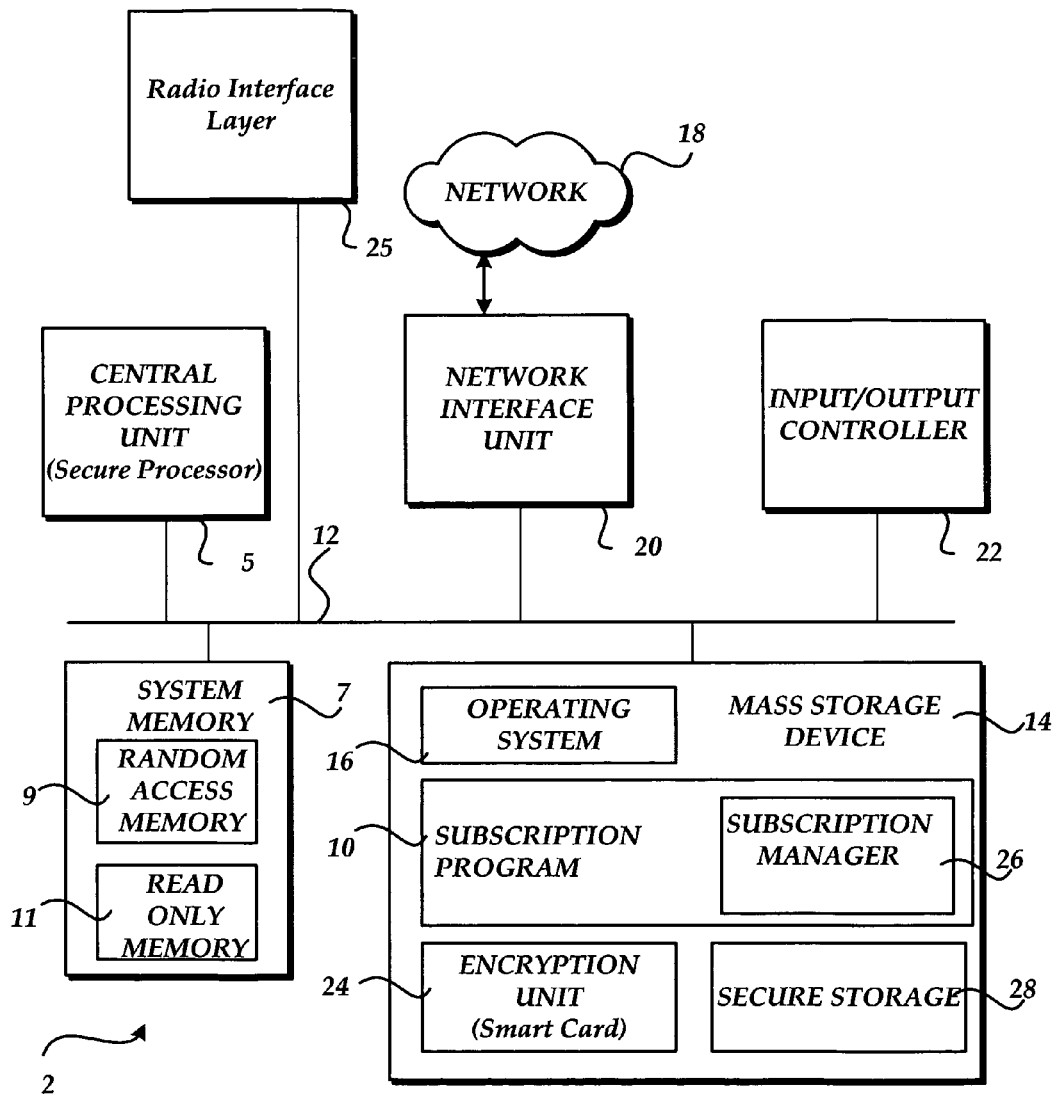
FIG. 2 shows an illustrative architecture for an electronic device.

FIG. 2 shows an illustrative architecture for an electronic device 2 utilized in various embodiments. The computer architecture shown in FIG. 2 may include fewer components then illustrated or more components depending on the uses of the electronic device. As illustrated, electronic device 2 includes a central processing unit 5 ("CPU"), a system memory 7, including a random access memory 9 ("RAM") and a read-only memory ("ROM") 11, and a system bus 12 that couples the memory to the CPU 5. CPU 5 may be implemented as a secure processor. A basic input/output system containing the basic routines that help to transfer information between elements within the computer, such as during startup, is stored in the ROM 11. The electronic device 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the electronic device 2. Although the description of computer-readable media contained herein refers to a mass storage device, such as a hard disk or CD-ROM drive, the computer-readable media can be any available media that can be accessed by the electronic device 2. According to one embodiment, mass storage device 14 includes a secure storage area 28 that is configured to prevent unauthorized access to the data that is contained within it. The secure storage 28 may be located on the device itself and/or on a card that is coupled to the electronic device. For example, the secure storage may be provided on an encryption unit 24 that is a smart card.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the electronic device 2.

According to various embodiments, the electronic device 2 may operate in a networked environment using logical connections to remote computers through a network 18, such as the Internet. The electronic device 2 may connect to the network 18 through a network interface unit 20 connected to the bus 12. The network interface unit 20 may also be utilized to connect to other types of networks and remote computer systems. The electronic device 2 may also include an input/output controller 22 for receiving and processing input from a number of other devices, including a keyboard, mouse, or electronic stylus (not shown).

Electronic device 2 also includes a communication connection, such as radio interface layer 25, which performs the function of receiving and/or transmitting radio frequency communications. Radio interface layer 25 facilitates wireless connectivity for electronic device 2 and may be utilized to receive the broadcast data described herein. Transmissions to and from radio interface layer 25 are conducted under control of the operating system 16. In other words, communications received by radio interface layer 25 may be disseminated to application programs, such as subscription program 10.

As mentioned briefly above, a number of program modules and data files may be stored in the mass storage device 14 and RAM 9 of the electronic device 2, including an operating system 16 suitable for controlling the operation of an electronic device, such as an embedded operating system, a mobile operating system, or a desktop operating system. For example, the operating system could be the WINDOWS MOBILE operating system or the WINDOWS XP operating system from MICROSOFT CORPORATION of Redmond, Wash. The mass storage device 14 and RAM 9 may also store one or more program modules. In particular, the mass storage device 14 and the RAM 9 may store a subscription program 10. The subscription program 10 is operative to provide functionality for receiving packets relating to a subscription and decrypting the packets using encryption unit 24 as long as the subscription is valid and/or the device is in one of the allowed trial periods.

Subscription manager 26 is configured to manage the subscription(s) of broadcast data that is received by electronic device 2. The subscription manager 26 is configured to examine a time-based packet value from a broadcast packet and determine whether or not to decrypt the packet. The encryption unit 24 is configured to decrypt the packets while the device is in an allowed trial period or when the packet is received within the subscription period. While subscription manager 26 is shown as part of application 10, subscription manager 26 may be separate from application 10.

Figure 3:
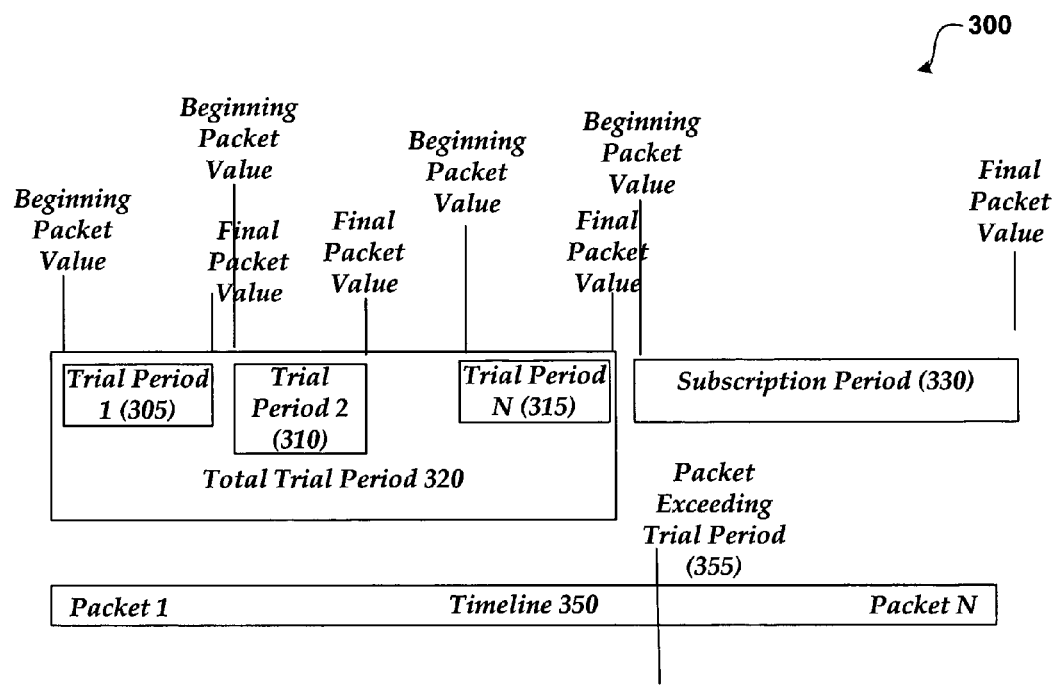
FIG. 3 shows a diagram including a trial period and a subscription period for a device.

FIG. 3 shows a diagram including a trial period and a subscription period (300) for a device. As illustrated, the total trial period 320 is divided into N different trial periods including trial period 1 (305), trial period 2 (310) through trial period N (315). The number of trial periods may be set to one or more trial periods. For example, one manufacturer or broadcaster may desire the device to have three trial periods, whereas another entity may only desire two different trial periods. Each trial period is a predetermined time duration. According to one embodiment, each trial period lasts for a predetermined number of packets defined by a beginning packet value that is received upon first reception by the device and a final packet value. Generally, the number of packets within a trial period or the subscription period corresponds to typical number of packets received by the device during that time period. Since different subscriptions broadcast at different rates, the number of packets defining a trial period may also vary for each subscription. Once the packet value exceeds the total trial period 320 as indicated by packet 355 on timeline 350, the device enters the subscription period which may also be defined by a beginning packet value and a final packet value. According to one embodiment, timeline 350 indicates that the packet value is continually adjusted and that each packet that is broadcast includes a unique time-based identifier. According to one embodiment, once a device starts a trial period, the initial beginning packet value is stored and used to determine whether or not the total trial period 320 has been exceeded. In other words, if a device gets returned during trial period 1 (305) and does not get reactivated until after the total trial period 320 then the device enters the subscription period 330. This helps to ensure that a device is not altered to allow for a free subscription. According to another embodiment, the total trial period 320 may be extended by adjusting the final packet value of the last allowed trial period (315). The final packet value is calculated by the beginning packet value of trial period N (315) plus the number of packets in a trial period. In this case, a determination is made as to whether there is a sufficient time lapse between use and non use of the device to justify starting a new trial period. The determination may be based on the number of packets received by the device during one time period along with a predetermined time period of non-activity. For example, another trial period may be allowed when a device is only used 95% of one trial period and there is a week of no activity between receiving another packet. This is only one example, however, of how this determination may be made. Many other ways of determining whether a device is between trial periods or is merely inactive may be utilized.

Figure 4:
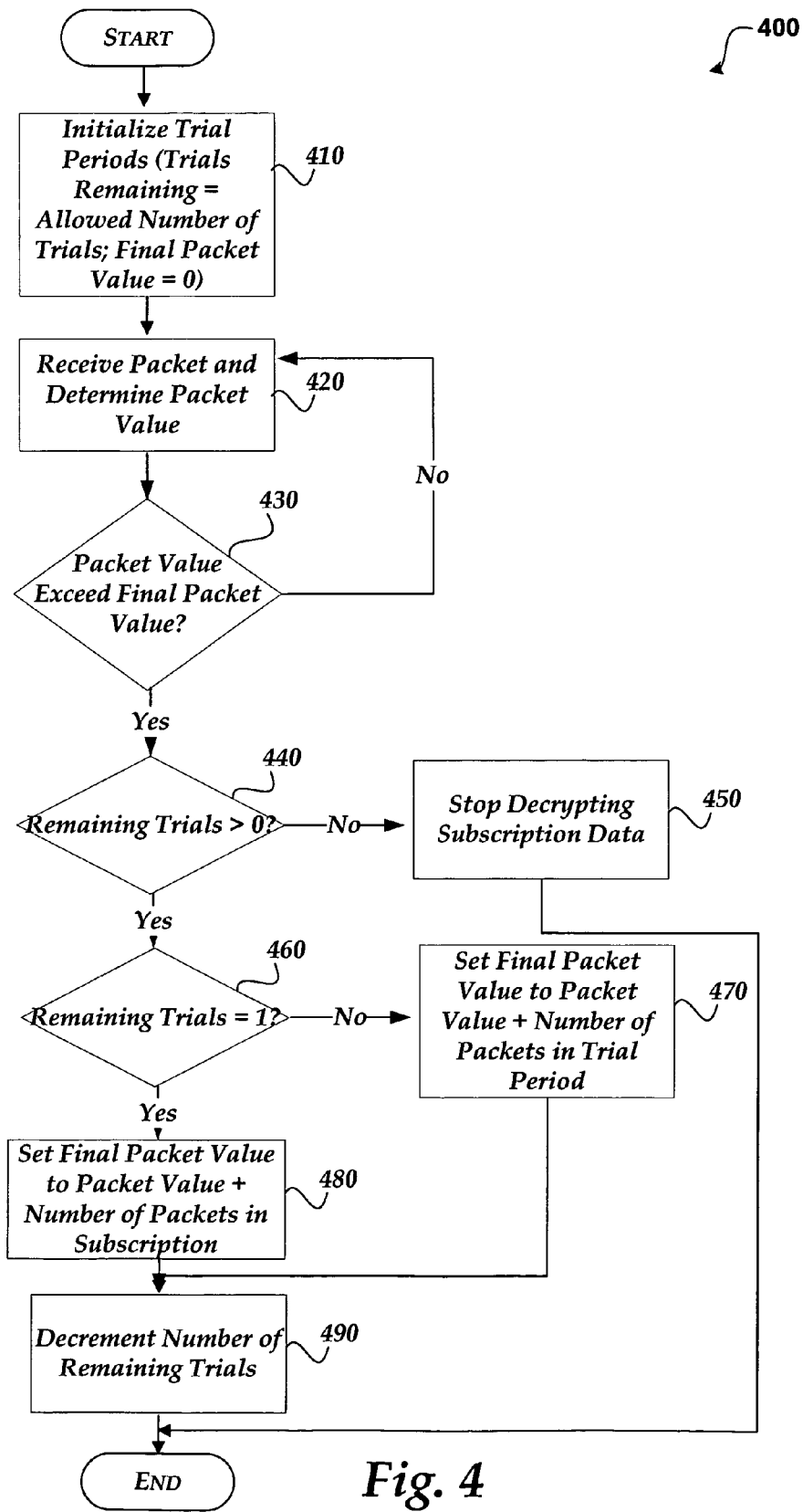
FIG. 4 illustrates a process for determining whether or not to decrypt subscription based data.

FIG. 4 illustrates a process for determining whether or not to decrypt subscription based data.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

Referring now to FIG. 4, after a start operation, the process flows to operation 410 where the trial periods are initialized on the device. The number and length of trials remaining may be set to many different values. For example, one vendor may allow two trial periods, another may allow three trial periods and another may only allow one trial period. The final packet value corresponds to the packet value of the final packet within the trial period. When the device is outside of the trial periods then the final packet value corresponds to the last packet value for the subscription period.

Moving to operation 420 a packet is received and its value is determined. According to one embodiment, the packet is a broadcast packet that is broadcast to many different devices at the same time. The packet value is a time-based value that indicates when that packet is broadcast. According to one embodiment, the packet broadcaster increments a number within each packet that is broadcast. According to another embodiment, the packet value may be broadcast in predetermined packets. For example, a packet value could be broadcast every five packets.

Transitioning to decision operation 430, a determination is made as to whether the packet value exceeds the final packet within the current trial period or subscription period. When the packet value does not exceed the final packet value, the device returns to operation 420 where the device continues to receive packets.

When the packet value is greater than the final packet value, the process moves to decision operation 440 where a determination is made as to whether there are any remaining trail periods left. When there are no trial periods left, the process flows to operation 450 where the device is instructed to terminate the decryption of data. According to one embodiment, the card containing the functionality to decrypt the subscription data is disabled such that the device can no longer decrypt the data. The process then moves to an end block and returns to processing other actions.

When the number of trials has not been exceeded, the process moves to decision operation 460, where a determination is made as to whether the number of trials remaining is equal to one. When the number of trials remaining does not equal to one, then the final packet value is set to the current packet value plus the number of packets in a trial period at operation 470. In other words, there is another trial period remaining after the current trial period expires.

When the trials remaining is equal to one the process flows to operation 480 where the final packet value is set to the current packet value plus the number of packets in the subscription.

Moving to operation 490, the number of trials remaining is decreased by one. The process then moves to an end operation and returns to processing other actions.

Figure 5:
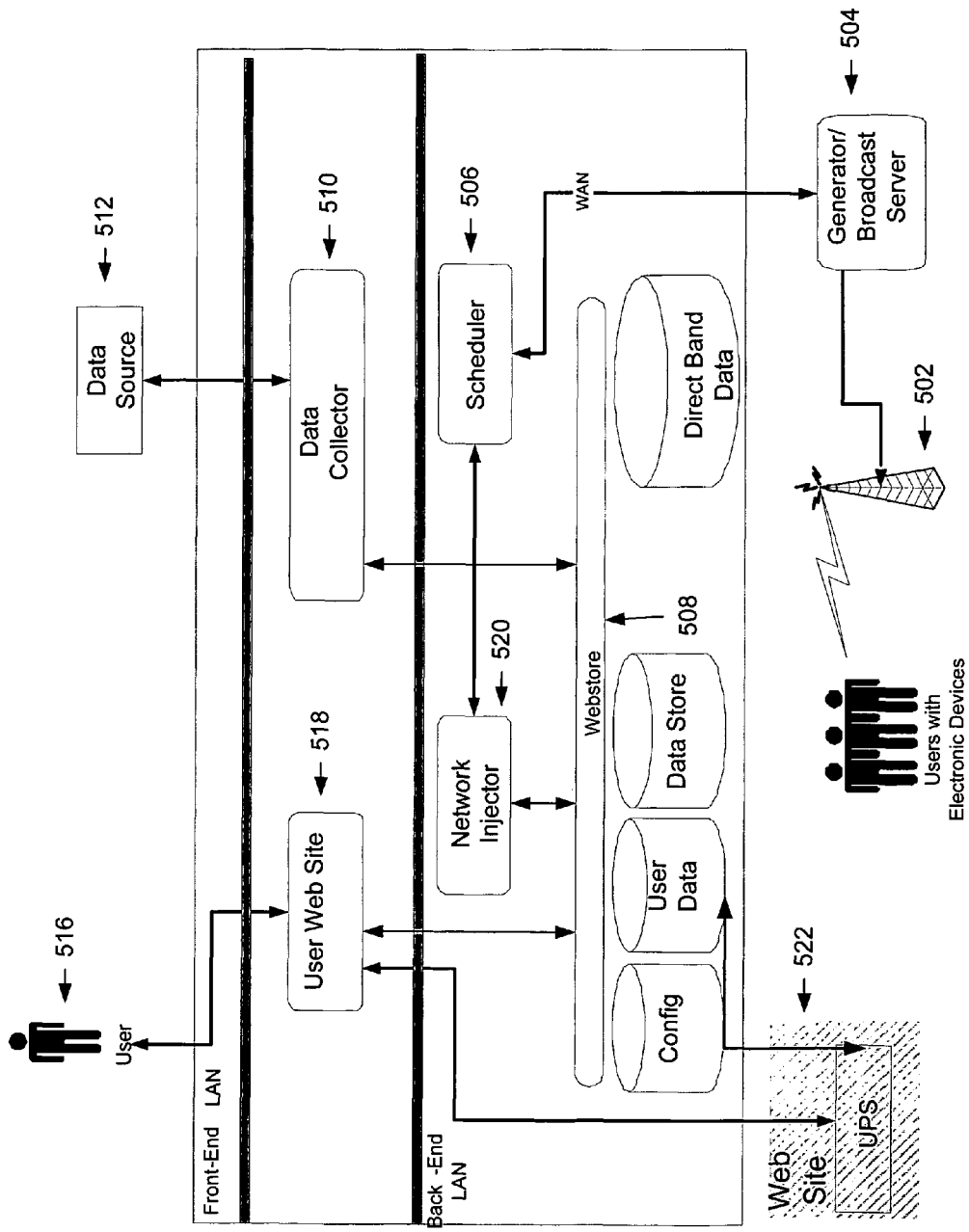
FIG. 5 illustrates a system for delivering and configuring channel information to an electronic device.

FIG. 5 illustrates a system for delivering and configuring channel information to an electronic device. According to one embodiment, predetermined channel information may be delivered to an electronic device. In this case, According to another embodiment, a user, such as user 516, may customize the channels they receive through user web site 518. Using website 518 the user may set options and select information associated with channels to which they have subscribed. For example, the user may configure the traffic information, weather information, and the like which are provided to the electronic device. The selected options are stored in a data store, such as webstore 508. Channel information and various options may also be automatically retrieved from a web site to which the user participates in. For example, web site 522 may be the user's home page in which the user has already selected various options customizing their page. These options may be used to populate the options associated with various channels. For example, a user's home location and work location could be used to calculate traffic information, a user's tracked stocks may be used in a stocks channel, a user's selected cities may be used in a weather channel, the user's selected theaters may be used in a movies channel, a user's news sources may be used in a news channel, and the like.

Data Collector 510 is configured to collect data from one or more data sources, such as data source 512, relating to a channel. For example, data collector 510 may retrieve traffic sensor data from one data source, incident reports from another data source, weather data from another source, and the like.

Data collector 510 may store the data in a data store, such as webstore 508, for later broadcast. According to one embodiment, data store 510 communicates with network injector 520 which then stores the data in webstore 508.

Broadcast transmitter tower 502 is arranged to provide a communication signal that is configured for reception by users with electronic devices that are located within a service region. Broadcast tower 502 transmits in response to generator/broadcast server 504. Generator 504 may communicate with scheduler 506 via a network communication link. Scheduler 506 is configured to schedule broadcast transmissions relating to channel information. The broadcast data may be broadcast according to a predetermined schedule. Some data may be broadcast more frequently during certain periods of the day (e.g. traffic data during rush hour). The device can also receive the broadcast data and determine how long the data is valid. This information may be included in the application on the device, or encoded in the data sent to the device. For example, traffic incident data may include an estimated completion time that may be used to remove the data, weather data could be valid for a day, and the like. This helps the device save resources by not having to repeatedly download the same data.

Selected services are entered in a database, such as webstore 508 for broadcast transmission at a later time. At the designated time (or time interval) scheduler 506 communicates with broadcast server 504 to begin a transmission sequence of data for the selected services. Broadcast server 504 converts the data to the appropriate format for transmission (i.e. an FM signal) and relays it to broadcast tower 502. In an alternative example, scheduler 506 communicates the selected services to the broadcast server. The broadcast server schedules the time interval for transmission of the selected service.

Each broadcast transmission corresponds to the transmission of one or more frames that are arranged in accordance with a frame protocol. Each frame may include multiple messages, where some messages are public broadcast (aka "global" or "shared" messages), while other messages are client specific messages (aka "personal" or "private" messages). Each frame includes a table of contents that indicates the extent of messages that are found within the next transmitted frame. Every client that is located within the designated service region receives the shared and personal messages. Personal messages, however, may only be decoded by a single client.

Each frame includes a header, a table of contents, and a message payload that includes the content for one or more selected services as previously described. The header also includes other information such as authentication data, identified service region, language, available stations for the identified service region, frame number, and time stamp. Control information may also be included in one of the headers to indicate broadcast conditions such as a change in available channels, an assignment of a service region to a particular wireless client device, and an assignment of a particular channel (frequency). In one example, each frame includes a change counter in one of the headers to indicate a change has taken place in the system. Wireless client devices (clients) may use the change counter to determine when to initiate a failover (when a broadcast tower becomes unavailable).

Client devices can determine the current service region based on information that is included in the broadcast transmissions. The time zone can be determined based on the current service region such that the client device can adjust any time related information. Moreover, the time and date functions of the client device may be synchronized based on information that is included in the broadcast transmissions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for decrypting subscription data, comprising:
receiving a packet; wherein the same packet is broadcast to many electronic devices at the same time;
determining a packet value from the received packet; wherein the packet value indicates a time that the packet is broadcast;
determining whether the packet is received within a total trial period or outside of the total trial period by comparing the packet value to a final packet value; and
decrypting the packet when the packet is received within the total trial period and updating the final packet value when the packet value is outside of the total trial period but within a subscription period.

2. The method of claim 1, further comprising initializing a number of trial periods within the total trial period when a device is configured.

3. The method of claim 1, wherein each of the number of trial periods within the total trial period is defined by a predetermined number of packets.

4. The method of claim 3, further comprising updating the final packet value to reflect an end of one of the trial periods within the total trial period; wherein the final packet value is based upon a first packet value that is obtained upon a first reception.

5. The method of claim 1, further comprising disabling decryption of the packet when the packet value indicates that the packet is received outside of the total trial period and outside of the subscription period.

6. The method of claim 2, further comprising storing the final packet value and the number of trial periods within a secure storage.

7. The method of claim 4, wherein the packet value increases with each packet that is broadcast.

8. The method of claim 7, wherein the packet value is contained within an unencrypted area of the packet.

9. The method of claim 2, wherein the packet is received through an FM broadcast.

10. An apparatus for decrypting subscription data, comprising:
a secure storage that is configured to store parameters relating to trial periods and a subscription period;
a communication connection configured to receive packets; wherein each of the packets are broadcast to a plurality of electronic devices at the same time and wherein each of the packets includes a time-based packet value that indicates when the packet is broadcast; and
an electronic system that is arranged to interact with the secure storage and the communication connection, wherein the electronic system is configured to:
examine a received packet to determine the time-based packet value;
determine whether the packet is broadcast is during one of the trial periods or during the subscription period by comparing the determined time-based packet value to a final packet value that indicates the end of one of the trial periods or the subscription period; and
decrypting an encrypted portion of the packet when the time-based packet value indicates the packet is broadcast within one of the trial periods or within the subscription period.

11. The apparatus of claim 10, wherein the secure storage is removable and wherein the electronic system is further configured to initialize a number of trial periods; initialize a number of packets defining a length of each of the trial periods and a number of packets defining a length of the subscription.

12. The apparatus of claim 10, wherein a first one of the trial periods starts when a first packet is received upon a first reception by the apparatus.

13. The apparatus of claim 11, wherein the electronic system is further configured to determine a period of use and non-use relating to receiving packets relating to the subscription.

14. The apparatus of claim 11, wherein the electronic system is further configured to access an unencrypted portion of the packet to obtain the packet value and disabling decryption of the encrypted portion of the packet when the packet value indicates that the broadcast packet is received outside of the trial period and outside of a subscription period.

15. The apparatus of claim 11, wherein the electronic system is further configured to update the final packet value to reflect the end of one of the trial periods when the packet value is outside one of the trial periods but within a total trial period.

16. The apparatus of claim 11, wherein the packet value increases with each packet that is broadcast that relates to the subscription data.

17. A computer-readable storage recording medium having computer executable instructions for decrypting subscription based data, comprising:
receiving a packet that includes a packet value within an unencrypted portion and subscription data within an encrypted portion; wherein the packet is broadcast through an FM transmission to many electronic devices and wherein the packet value is adjusted with each broadcast of a packet;
determining whether the packet is received within a trial period or within a subscription period by determining whether the packet value in the received packet is between a beginning packet value and a final packet value; and
decrypting the packet when the packet is received within the trial period or within the subscription period.

18. The computer-readable storage recording medium of claim 17, further comprising accessing a smart card to determine whether the packet is received within the trial period or within the subscription period.

19. The computer-readable storage recording medium of claim 17, further comprising storing trial period parameters within a secure storage; wherein the trial period parameters include a number of packets for the trial period and the subscription period.

20. The computer-readable storage recording medium of claim 19, further comprising disabling a secure processor or a smart card when the packet is not received within the trial period or the subscription period.

* * * * *